United States Patent [19]

Smolker

[11] 3,882,323

[45] May 6, 1975

[54] METHOD AND APPARATUS FOR PROTECTING SENSITIVE INFORMATION CONTAINED IN THIN-FILM MICROELECTONIC CIRCUITRY

[75] Inventor: Gary Smolker, Venice, Calif.

[73] Assignee: The United States of America as represented by the Secretary of the Navy, Washington, D.C.

[22] Filed: Dec. 17, 1973

[21] Appl. No.: 425,405

[52] U.S. Cl....... 307/202 A; 102/28 R; 317/101 CE; 317/101 A; 174/68.5; 174/DIG. 3; 149/2

[51] Int. Cl......................... H05k 1/18; C06b 19/00

[58] Field of Search.. 307/202 A; 102/28 R, 70.2 R; 109/29, 36, 37; 149/2, 37, 109; 317/101 CC, 101 CE, 101 A; 174/DIG. 3, 68.5

[56] References Cited

UNITED STATES PATENTS

| | | | |
|---|---|---|---|
| 3,394,218 | 7/1968 | Foudriat | 174/68.5 |
| 3,697,668 | 10/1972 | Campbell | 174/68.5 |

*Primary Examiner*—John S. Heyman
*Attorney, Agent, or Firm*—Richard S. Sciascia; Paul N. Critchlow

[57] ABSTRACT

The microelectronic circuitry is formed in two separate parts one of which is a microdiscrete chip-like module containing the sensitive information. The other part is represented by the balance of the circuitry. The microdiscrete module is formed with its own individual self-destruct capability permitting immediate destruction upon command when the module is operately coupled to the balance of the circuitry. The entire circuitry does not become classified or sensitive until the individual module is bonded to it. Thus, protection against compromise can be provided by keeping the microdiscrete module separate from the balance of the circuitry. The self-destruct capability is provided by thin-films of adjacently-deposited aluminum and tungstic oxide sandwiched between a glass substrate and a thin-film insulator, the sensitive network being formed on the insulator. In forming the module, parameters such as film thicknesses and materials, as well as thermal conductivities of the materials are controlled to assure complete destruction of the sensitive network.

5 Claims, 5 Drawing Figures

PATENTED MAY 6 1975 3,882,323

METHOD AND APPARATUS FOR PROTECTING SENSITIVE INFORMATION CONTAINED IN THIN-FILM MICROELECTONIC CIRCUITRY

BACKGROUND OF THE INVENTION

U.S. Pat. No. 3,666,967 issued May 30, 1972 to inventors, Keister and Smolker discloses a multi-layer thin film circuit board having thin film layers of tungstic oxide and aluminum materials to provide a self-destruct capability. The sandwich formed by these thin film materials is coupled to a switched voltage source to produce ignition and cause the destruction of the thin film circuit of the circuit board. Although the arrangement disclosed by this patent represents a valuable contribution compatible with present-day microelectronic circuitry technology, there are several rather serious drawbacks which have restricted its widespread use. Thus, from an operative viewpoint, it is known that the self-destruct capability of the arrangement is not wholly reliable principally because the thermite reaction of the self-destruct films is difficult to sustain. Ignition of the thermite layer initiates a self-destructive chemical reaction which must be self-sustaining since the ignition circuit then is opened to eliminate external power. The obvious result is that a so-called 'thermal quenching' may occur. When this happens, portions of the microelectronic circuitry are not completely destroyed. If those portions which remain intact or reconstructable should contain the sensitive or classified information, the self-destruction obviously must be considered as a failure and the sensitive information possible compromised. Any possible compromise of such sensitive material is of such critical concern that usually an assumption of compromise must follow.

A further difficulty involved in the use of the patented arrangement is the fact that the sensitive information of its circuitry is an integral part of the circuit board so that the entire circuit board must be protected at all times such as during its transportation and storage as well as its operative periods of use. This need for constant monitoring and protection of the entire circuit board is unnecessary and, to the extent that it is unnecessary, it simply multiplies the chances of compromise as well as represents an avoidable precaution which involves extra care and effort.

BRIEF SUMMARY OF THE INVENTION

The sensitive information of a microelectronic thin-film circuit can be protected by forming the circuitry in two separate and distinct parts one of which mounts a network of thin film circuitry representative of the sensitive information. This sensitive network is formed independently on a chip-like, self-destruct module capable of being detachably coupled into the remainder of the microelectronics circuitry for electrically completing it. Structurally-considered, the module is formed of a glass substrate on which is deposited a sandwich of thin, self-destruct films which preferably are films of aluminum and tungstic oxide, although other aluminum-metal oxide films may be used. A thin layer of insulation, such as silicon oxide, is deposited over the sandwich of the self-destruct films and the network of thin-film resistive elements deposited by conventional photoresist and etching techniques on the insulation. When bonded or coupled to the balance of the microelectronic circuitry, the resistive network can be destroyed by igniting the sandwich of thin-film materials. For a number of reasons, including its minute size complete destruction of sensitive information is assured. Further, certain structural and functional considerations are applied to insure against any thermal quench. During inoperative periods, such as during transportation or storage, the microdiscrete module is not bonded into the circuit. Consequently, the customary extreme precautions used to protect classified or sensitive information are not needed until the module is coupled into the balance of the circuitry.

BRIEF DESCRIPTION OF THE DRAWINGS

The present invention is illustrated in the accompanying drawings of which.

DESCRIPTION OF THE INVENTION

Figures 1, 2:
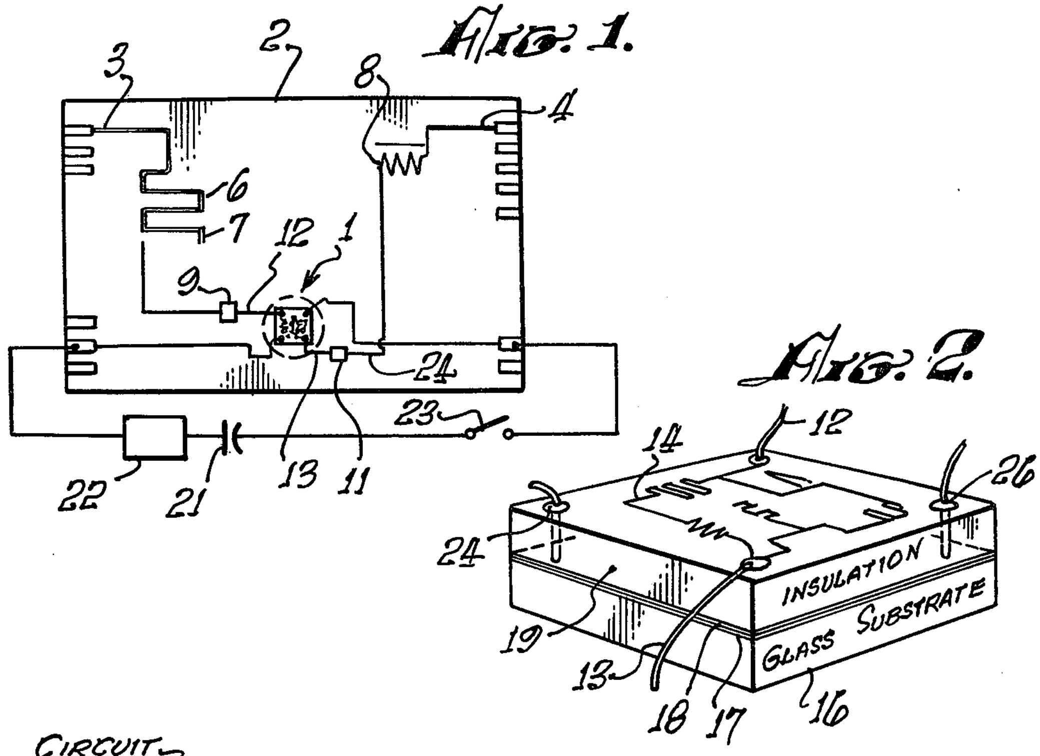
FIG. 1 is a schematic plan view of a typical microelectronic circuit showing in a dotted-line circle the chip-like module of the present invention.
FIG. 2 is an enlarged perspective view of the chip-like module shown in the dotted-line circle of FIG. 1.
Figure 3:
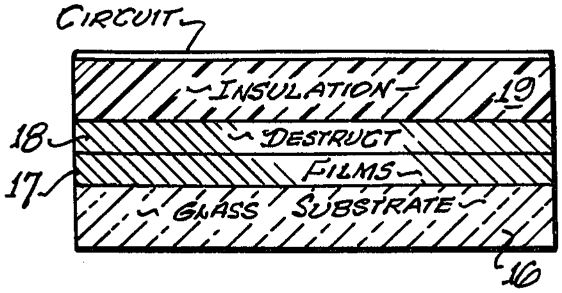
FIG. 3 is a schematic sectional view of the multi-layered chip-like module.

The circuitry illustrated in FIG. 1 is provided solely for descriptive purposes and, obviously, is quite schematic. Insofar as an understanding of the present invention is concerned, it is sufficient to note that the circuitry is constructed in two separable parts, the first being a microdiscrete, chip-like module 1 shown in the dotted-line circle and the second part comprising the balance of the entire circuitry. In general, the entire circuitry can be considered being formed on a microelectronic circuit board, the circuitry 2 having an input 3 and an output 4 between which are arranged a plurality of active and passive circuit elements 6, 7 and 8 which may be present in a wide variety of forms. To permit chip-like module 1 to be electrically coupled into the circuitry, the circuit can include bonding areas such as are schematically shown as gold bonding areas 9 and 11. Leads 12 and 13 couple the chip circuitry to these bonding areas. The physical attachment of the chip can be achieved in any conventional manner such as by the use of Molytab carriers, solder or adhesive.

A primary purpose of the invention is to protect against compromise the classified or sensitive information contained in the circuitry. In part, this purpose is achieved by forming the sensitive or classified information on chip-like module 1 which, as already indicated, is an entity or, in other words, a separate and distinct part of the circuitry. More specifically, the sensitive information is contained in a resistive network 14 formed on the chip in the manner better shown in FIG. 2. One obvious advantage of forming the sensitive hardware on such a separable chip is the fact that the entire microelectronic circuitry does not become sensitive or classified until the chip with its associated resistive network is coupled to it. Consequently, the entire circuitry, instead of being monitored throughout processing will not have to be monitored until the chip is mounted on it. Further, the chips information also is not sensitive until so mounted.

Another feature of the invention is the fact that chip or module 1 is formed as a self-destruct, microdiscrete component capable of completely destroying the sensitive information of its resistive circuit in response to a signal or command initiated at one or more remote locations. As shown in FIG. 2, the chip is formed with a glass substrate 16 on which a sandwich of self-destruct films 17 and 18 are deposited. A thin insulation layer 19 of silicon oxide or the like is deposited on the self-destruct film sandwich and resistive circuit 14 formed on the insulation layer.

As presently envisioned the destruct process of the invention is a thermal process and problems such as heat transfer and effective chemical reaction must be carefully resolved to assure complete self-destruction. For example, the heat transfer problems involve such design considerations as the ignition of the self-destruct films, the choice of such materials as the substrate and the insulator layer, the choice of the heat-generating solid-state chemical reaction materials and the geometric placement of these materials. Also, the chemical reaction problems are concerned with the choice of reactants, the fabrication of reactants in thin film form and the ability to take advantage of the kinetics and thermal dynamics of the chosen reaction.

In principle, it is intended that a destruct signal be applied to the self-destruct films to promote an ignition of the films and produce the chemical reaction which thermally destroys the sensitive information. Any appropriate ignition circuit can be used, although it is preferred to employ a capacitor discharge trigger circuit such as illustrated in FIG. 1. Specifically, FIG. 1 shows a circuit including a capacitor 21, a power source 22, and a trigger switch 23 which, when closed, applies the charge of the capacitor across the destruct film sandwich. It has been found that the release of less than three joules of energy are sufficient for ignition and that an 80 microfarad capacitor charged to about 300 volts is adequate for present purposes.

Figure 5:
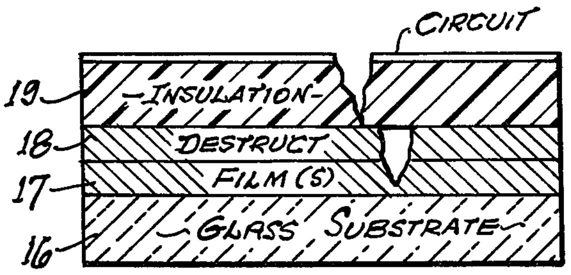

Ignition is applied as a pulse of a particular duration and magnitude and, once the chemical reaction of the destruct films is achieved, the ignition circuit across the film is opened so that the external power source has no further effect. The problem then becomes one of ensuring a complete destruction by eliminating the possibility of a so-called thermal quenching of the chemical reaction resulting from the ignition pulse. Considered in greater detail, the energy flowing through the destruct film is transferred to the substrate below the film as well as to the insulation layer above it. If this sandwich provided by the substrate and the insulation layer is correctly designed, the thin film will reach its auto-ignition temperature and at this point the resulting reaction opens the self-destruct circuit and turns off the source of the external energy in the trigger circuit. However, if the rate of heat loss in the destruct path is more rapid than the propagation of a chemical reaction heat a so-called thermal quenching results or, in other words, the temperature of the film is reduced below its auto-ignition temperature and the film cannot then destruct. Such a situation is illustrated in FIG. 5 and, of course, when this situation occurs there is a distinct possibility of compromise due to the incomplete chemical reaction and, therefore, incomplete destruction of the sensitive hardware.

For these and other reasons, the materials used for the various layers of the micro-discrete module, as well as the dimensions of these layers becomes a significant factor. In practice it has been found experimentally and theoretically that a substrate material of approximately 10 mils is preferred and that the substrate material should have particular thermal properties suited for the present process. For example, a glass substrate formed of Corning, No. 0211 microsheet has produced good results, this particular material being a glass-like material having a thermal conductivity of 0.0025 Cal/cm-/sec/degree C. Approximately such a thermal conductivity is considered to be a significant factor in insuring against the thermal quench.

The self-destruct film sandwich preferably is provided by alternate layers of tungstic oxide approximately 800 angstroms thick and aluminum approximately 1100 angstroms. As has been indicated, such a self-destruct sandwich is disclosed in U.S. Pat. No. 3,666,967 and the disclosure of this patent can be referred to for additional details relative to the nature of the films and the manner in which they are deposited. However, in particular, the tungstic oxide film is applied by evaporation from a 99.9% pure tungstic oxide powder and the aluminum film similarly deposited from a 99.99% pure aluminum wire heated and evaporated for depositing by vacuum on substrate 16. These thicknesses, of course, will depend upon a particular application as well as the material with which the destruct films are used.

Other variations include the fact that it is of no particular present concern which the two films are first deposited and, also the ignition pulse can be applied to one or the other of the films or to both simultaneously. As indicated, the use of the tungstic oxide-aluminum destruct film is preferred because its thermite reaction has proven highly successful in assuring complete destruction. Other film combinations such as $Al+Fe_2O_3$, $Al+MnO_2$ and $Al+CrO_2$ can be substituted and, in view of the extreme minuteness of the chip-like module, these and other material should prove reliable in appropriate germetric arrangements.

Silicon oxide insulation layer 19 is deposited in the conventional manner to a thickness of approximately 10,000 angstroms although, here again, other insulation materials can be substituted providing their thermal properties are compatible. To form resistive circuit 14, a nichrome microfilm first is deposited on the insulation layer and the microfilm then photoetched in conventional manner to produce the desired resistor design. Chromium gold terminals also can be vapor deposited on the insulation layer for bonding purposes. However, for clarity these bonding areas are shown in FIG. 2 simply as terminals 12 and 13, as well as terminals 24 and 26 by means of which the ignition circuit is coupled to the destruct film. Again, it is to be noted that the sensitive information to be destroyed is to be contained in resistive circuit 14 so that the objective of the destruct process is the complete destruction of the circuit.

Figure 4:
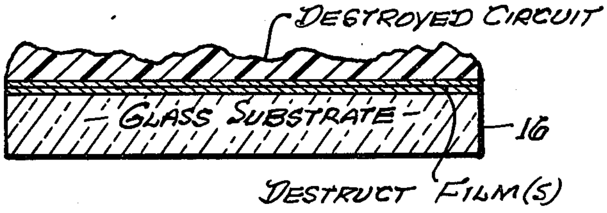
FIG. 4 is another schematic view illustrating the manner in which the resistive network of the module is destroyed, and FIG. 5 provides an example of an incomplete destruction of the resistive circuitry produced by a so-called thermal quench.

The manner in which resistive circuit 14 is destroyed is illustrated in FIG. 4. In particular, the ignition of the destruct film raises the temperature of the film to its auto-ignition temperature which is approximately 1520°F and when this temperature is reached, a self-sustaining exothermic chemical reaction commences. The fact that the reaction is exothermic in nature is an important consideration since it aids significantly in insuring against thermal quenching. In this regard, the heat of the aluminum and tungstic oxide reaction is about 715 calories per gram. As a result of the heat flowing from the chemical reaction through the sandwich formed by the insulation layer and the substrate, the insulation layer is caused to warp and crack and the warping and cracking of the layer lifts the nichrome resistor layer sufficiently to remove all trace of the circuit pattern. Concurrently, the nichrome resistor pattern is degraded by the heat flowing from the exothermic reaction.

In summation, perhaps the most significant advantage of the present arrangement is the fact that it assures a complete destruction of the sensitive information and this assurance is provided both by the extremely minute area that is to be destroyed and by the proper selection and placement of the materials. As has been indicated, destruction of an entire circuit board and its circuitry is a far more difficult task and the attempts have not met with the requisite consistent success. Obviously, if destruction is not complete, the remaining portions may well be the sensitive ones or they may provide sufficient leads so that the sensitive information can be reconstituted. Coupled with the advantages inherent in the relative minuteness of the microdiscrete chip is the fact that additional protection also is provided by the fact that the circuitry does not become sensitive or classified until the chip is operatively bonded. Also, the chip circuitry itself usually does not reveal any sensitive information until so bonded. Thus, during inoperative periods of storage or transportation, the two parts of the microelectronic circuit can be handled separately and this capability greatly reduces the need for security monitoring.

It further is to be noted that the present self-destruct chip is compatible for use with various types or classes of microcircuits including both thick and thin-film types. Also, it can be employed either as a chip component or a substrate in hybrid microcircuits. Obviously, a single circuit board can include one or more of the chips and they can be provided in many sizes to suit existing needs.

Obviously many modifications and variations of the present invention are possible in the light of the above teachings. It is therefore to be understood that within the scope of the appended claims the invention may be practiced otherwise than as specifically described.

I claim:

1. Self-destruct two-part microelectronic circuit apparatus comprising:

a first electrical circuit formed of an incomplete network of circuit elements, a wafer-like circuit chip, and a second electrical circuit carried by said chip and having a network of resistive elements, said first and second circuits being adapted to be detachably interconnected for electrically completing said two-part microelectronic circuit;

said chip including:

a glass like substrate, an ignitable self-destruct thin film sandwich formed of aluminum and a metal oxide deposited adjacently one on the other on said substrate, said film sandwich having an auto ignition temperature of about 1500°F and being capable when ignited to produce an exothermic chemical reaction sufficient to sustain combustion, ignition means coupled to said film sandwich a thin electrical insulator film deposited on said sandwich, and the aforementioned network of resistor elements; said network being formed from a thin film of electrically resistive material deposited on said insulative film, whereby information contained in said resistive network can be destroyed by igniting said film sandwich, the heat of reaction of said ignited sandwich mechanically distorting said insulative film sufficiently to destroy said resistive network deposited thereon.

2. The apparatus of claim 1 wherein said self-destruct film sandwich is formed of adjacently-deposited layers of aluminum and tungstic oxide.

3. The apparatus of claim 2 wherein said glass substrate has a thermal conductivity of about 0.002 cal/cm/sec/°C.

4. The apparatus of claim 3 wherein insulator the aluminum film is about 800 A° thick, the tungstic oxide film about 1100 A° thick and the insulation layer about 10000 °A thick.

5. The apparatus of claim 3 wherein said ignition means is a capacitor discharge trigger circuit coupled across said destruct film sandwich.

* * * * *